United States Patent
Park et al.

(10) Patent No.: US 11,455,583 B2
(45) Date of Patent: Sep. 27, 2022

(54) METHOD FOR SELECTING WORKER ACCORDING TO FEATURE OF PROJECT BASED ON CROWD SOURCING

(71) Applicant: CROWDWORKS INC., Seoul (KR)

(72) Inventors: Min Woo Park, Seongnam-si (KR); Ju Yeong Kim, Seoul (KR)

(73) Assignee: CROWDWORKS INC., Seoul (KR)

(*) Notice: Subject to any disclaimer, the term of this patent is extended or adjusted under 35 U.S.C. 154(b) by 0 days.

(21) Appl. No.: 17/519,981

(22) Filed: Nov. 5, 2021

(65) Prior Publication Data

US 2022/0058568 A1    Feb. 24, 2022

Related U.S. Application Data

(63) Continuation of application No. PCT/KR2020/006512, filed on May 19, 2020.

(30) Foreign Application Priority Data

May 29, 2019  (KR) .................... 10-2019-0062958

(51) Int. Cl.
*G06Q 10/06* (2012.01)

(52) U.S. Cl.
CPC .................. *G06Q 10/063118* (2013.01)

(58) Field of Classification Search
CPC .................................................. G06Q 10/06
See application file for complete search history.

(56) References Cited

U.S. PATENT DOCUMENTS 9,411,917 B2 *  8/2016  Gil .................... G06F 30/20

| 2011/0282793 | A1* | 11/2011 | Mercuri | G06Q 30/0214 |
| | | | | 705/80 |
| 2012/0029963 | A1* | 2/2012 | Olding | G06Q 10/06 |
| | | | | 705/7.14 |
| 2012/0088220 | A1* | 4/2012 | Feng | G09B 7/00 |
| | | | | 434/362 |

(Continued)

FOREIGN PATENT DOCUMENTS

| JP | H11-288435 A | 10/1999 |
| JP | 2004-005276 A | 1/2004 |

(Continued)

OTHER PUBLICATIONS

International Search Report issued in PCT/KR2020/006512; dated Aug. 26, 2020.

(Continued)

*Primary Examiner* — Kurtis Gills
(74) *Attorney, Agent, or Firm* — Studebaker & Brackett PC

(57) ABSTRACT

A worker selection method according to characteristics of a crowdsourcing-based project is provided. The worker selection method according to characteristics of a crowdsourcing-based project comprises the steps of: identifying functional elements included in a project scheduled to open; extracting a worker's participation history in a previous project; extracting functional elements included in the previous project of the worker; extracting average working hours for each functional element with respect to the functional elements included in the project scheduled to open, among the functional elements included in the previous project; calculating a matching value of the worker for the project scheduled to open, on the basis of the extracted average working hours for each functional element and the number of tasks which have been performed using each functional element in the previous project by the worker; and selecting the worker on the basis of the calculated matching value of the worker for the project scheduled to open.

8 Claims, 5 Drawing Sheets

(56) References Cited

U.S. PATENT DOCUMENTS

| | | | | |
|---|---|---|---|---|
| 2013/0275187 | A1* | 10/2013 | Patel | G06Q 10/06398 |
| | | | | 705/7.42 |
| 2014/0165071 | A1* | 6/2014 | Celis | G06F 9/5066 |
| | | | | 718/104 |
| 2014/0298343 | A1* | 10/2014 | Rajan | G06F 9/5027 |
| | | | | 718/102 |
| 2016/0232474 | A1* | 8/2016 | Zou | G06Q 10/063112 |
| 2017/0076241 | A1* | 3/2017 | Kunde | G06Q 50/01 |
| 2019/0066029 | A1 | 2/2019 | Hancock et al. | |

FOREIGN PATENT DOCUMENTS

| | | |
|---|---|---|
| JP | 2006-318331 A | 11/2006 |
| JP | 2007-026404 A | 2/2007 |
| JP | 2011-013763 A | 1/2011 |
| KR | 10-2009-0070935 A | 7/2009 |
| KR | 10-2014-0095956 A | 8/2014 |
| KR | 10-2016-0124278 A | 10/2016 |
| KR | 10-2018-0016069 A | 2/2018 |
| KR | 10-2018-0065840 A | 6/2018 |

OTHER PUBLICATIONS

"Notice of Reasons for Refusal" Office Action issued in JP 2020-535497; mailed by the Japanese Patent Office dated Sep. 21, 2021.
"Grant of Patent" Office Action issued in KR 10-2019-0062958; mailed by the Korean Intellectual Property Office dated Oct. 23, 2019.

* cited by examiner

FIG. 5

| History and data for each functional element of previous project A | | | |
|---|---|---|---|
| | Functional element a | Functional element b | Functional element c |
| Total working hour (sec) | 1500 | 800 | 600 |
| Total number of work | 100 | 50 | 12 |
| Average working hour (sec) | 15 | 16 | 50 |
| Number of rejections | 10 | 25 | 3 |
| Working hour for rejected work (sec) | 150(15*10) | 400(16*25) | 150(50*3) |
| Working hour calculated considering number of rejections (sec) | 1650(1500+150) | 1200(800+400) | 750(600+150) |
| Average working hour calculated considering number of rejections (sec) | 16.5(1650/100) | 24(1200/50) | 62.5(750/12) |

FIG. 6

| History and data for each functional element of previous project A | | | |
|---|---|---|---|
| | Functional element a | Functional element b | Functional element c |
| Total working hour (sec) | 1500 | 800 | 600 |
| Total number of works | 100 | 50 | 12 |
| Average working hour (sec) | 15 | 16 | 50 |
| Number of rejections | 10 | 25 | 3 |
| Working hour for rejected work (sec) | 150 | 400 | 150 |
| Working hour calculated considering number of rejectiosn | 1650 | 1200 | 750 |
| Total working hour calculated considering number of rejections | 3600 | | |
| Functional element % | 46% | 33% | 21% |

FIG. 7

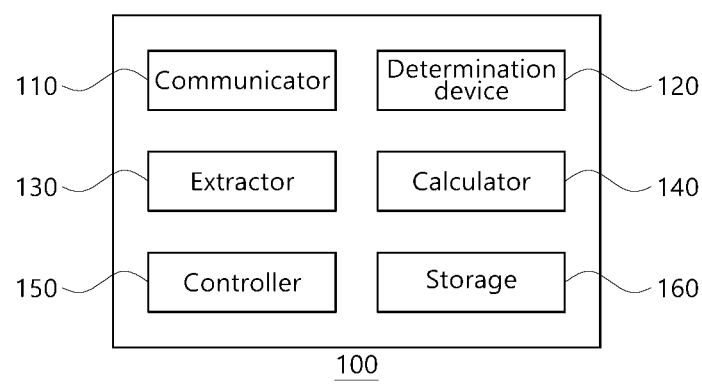

METHOD FOR SELECTING WORKER ACCORDING TO FEATURE OF PROJECT BASED ON CROWD SOURCING

CROSS-REFERENCE TO RELATED APPLICATIONS

The present application is a continuation of International Patent Application No. PCT/KR2020/006512, filed on May 19, 2020, which is based upon and claims the benefit of priority to Korean Patent Application No. 10-2019-0062958 filed on May 29, 2019. The disclosures of the above-listed applications are hereby incorporated by reference herein in their entirety.

BACKGROUND

Embodiments of the inventive concept described herein relate to a method for selecting a worker according to a feature of a project based on crowd sourcing.

In recent years, more and more corporations have been collecting and processing large amount of data, based on crowd sourcing in which a general public participates in some processes of their corporate activities. That is, the corporation may open a project and allow the general public, i.e., worker, to participate in the project, thereby collecting necessary information from a work result completed by the worker.

Here, the corporation may be required to classify a type of the project scheduled to be open and assign the project to a suitable worker to collect the information more efficiently and accurately.

The project scheduled to be open has been conventionally assigned to the worker in such a manner that the project is classified into any of predetermined items such as a template type, a difficulty level or a work type, the worker is evaluated according to the feature and function of the classified project, and the suitable worker is then matched to the project.

However, when the project is classified into such a predetermined item, it may be necessary to infinitely add a new item even with only a slight exception to the feature and function of the project.

In addition, it may be assumed that the project scheduled to be open is classified into an item A/B/C, and there is no project classified into the item A/B/C among projects previously completed, that is, there is no project exactly the same as the project scheduled to be open among the previous projects. In this case, an external factor other than the factor of the previous project may be required to be included as an evaluation factor for matching the worker to the project scheduled to be open when a worker pool is generated for the project scheduled to be open.

In addition, it may be bothersome to manually update the classified item for classifying the project according to a trend, and the item may be classified into a different item even though the item belongs to the same project when the classified item is not regularly updated.

SUMMARY

Embodiments of the inventive concept provide a method for selecting a worker according to a feature of a project based on crowd sourcing, in which each functional element necessary for a work of one project scheduled to be open is classified and the worker is then evaluated and selected based thereon, rather than a conventional method in which the project scheduled to be open is classified into each item and the worker is then matched to the project.

A technical task of the inventive concept is not limited to the task mentioned above, and other tasks not mentioned here may be obviously understood by those skilled in the art from the following description.

According to an embodiment, a method for selecting a worker according to a feature of a project based on crowd sourcing includes: identifying a functional element included in a project scheduled to be open; extracting a history in which the worker participates in a previous project; extracting the functional element included in the previous project of the worker; extracting an average working hour in which each functional element is used, with respect to the functional element included in the project scheduled to be open among the functional elements included in the previous project; calculating a matching value of the worker for the project scheduled to be open, on the basis of the extracted average working hour in which each functional element is used and the number of works performed by the worker using each functional element in the previous project; and selecting the worker on the basis of the calculated matching value of the worker for the project scheduled to be open, wherein the functional element is determined based on a work tool for performing the project, the work tool is a tool provided by the project based on crowd sourcing, and used by the worker to perform the work required for the project based on crowd sourcing, and an average working hour, in which each functional element is used, is calculated based on a total working hour in which each work tool is used, a total number of the works, an average working hour, the number of rejections, a working hour of a rejected work and a working hour considering the number of the rejections.

In addition, the average working hour in which each functional element is used may be calculated considering a difficulty level of the work performed using the corresponding functional element.

In addition, the functional element may be determined based on the work tool for performing the project.

In addition, the calculating of the matching value of the worker for the project scheduled to be open may include: calculating a first working hour by multiplying the average working hour in which a first functional element is used and the number of works performed by the worker using the first functional element; calculating a second working hour by multiplying the average working hour in which a second functional element is used and the number of works performed by the worker using the second functional element; calculating an n-th working hour (here, n is a natural number) by multiplying the average working hour in which an n-th functional element (here, n is a natural number) is used and the number of works performed by the worker using the n-th functional element; and summing the first working hour, the second working hour, . . . and the n-th working hour together.

In addition, the plurality of functional elements may each be included in the different previous projects when the plurality of functional elements are determined among the first functional element, the second functional element, . . . and the n-th functional element, based on the same work tool.

In addition, in the calculating of the matching value of the worker for the project scheduled to be open, zero may be set as a value of the number of works performed using the specific functional element to reduce influence of the working hour in which the corresponding functional element is used when the number of the works performed by the worker using the corresponding functional element is less than or equal to an average number of works performed using the corresponding functional element.

In addition, in the calculating of the matching value of the worker for the project scheduled to be open, zero may be set as a value of the number of the works performed using the specific functional element to reduce the influence of the working hour in which the corresponding functional element is used in a case where the worker has a rank lower than a predetermined standard rank, when the workers are ranked based on the number of the works performed using the corresponding functional element.

In addition, wherein in the selecting of the worker, the plurality of workers may be ranked in descending order based on the matching value of the worker for the project scheduled to be open, and the worker is selected based on the number of the workers required for the project scheduled to be open.

In addition, the history in which the worker participates in the previous project may be information on the plurality of projects, in each of which the specific worker previously participates and performs the work.

According to another embodiment, a program for selecting a worker according to a feature of a project based on crowd sourcing may be stored in a computer-readable recording medium, and may be associated with the computer to implement the method of selecting a worker according to a feature of a project based on crowd sourcing.

Other details of the inventive concept are described in a detailed description and are illustrated in the accompanying drawings.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 5 is an exemplary view showing that a working hour in which each functional element is used in a previous project, in which the worker participates, is calculated according to an embodiment of the inventive concept;

FIG. 6 is an exemplary view showing a composition ratio of each functional element in the previous project according to an embodiment of the inventive concept; and FIG. 7 is a block diagram of an apparatus for selecting a worker according to a feature of a project based on crowd sourcing according to an embodiment of the inventive concept.

DETAILED DESCRIPTION

Various advantages and features of the inventive concept and methods accomplishing them will become apparent from the following description of embodiments with reference to the accompanying drawings. However, the inventive concept is not limited to embodiments described below, and may be implemented in various different forms. Embodiments are provided only to make the inventive concept complete and allow those skilled in the art to completely recognize the scope of the inventive concept, and the inventive concept is defined by the scope of the claims.

Meanwhile, terms used in the present specification are for explaining embodiments rather than limiting the inventive concept. In the specification, a singular form includes a plural form unless explicitly described otherwise. A term "comprise" and/or "comprising" used in the specification does not preclude the presence or addition of one or more other components in addition to the mentioned components. The same reference number may designate the same component throughout the specification, the term "and/or" may include any one or all combinations of the mentioned components. Terms "first", "second" and the like may be used to indicate various components, and do not limit the corresponding components. These terms are only used in order to distinguish one component from the other components. A "first" component may thus be named a "second" component without departing from the scope of the inventive concept.

Unless defined otherwise, every term (including technical and scientific terms) used in the specification have the same meaning as meaning commonly understood by those skilled in the art to which the inventive concept pertains. In addition, a term generally used as defined in a dictionary is not to be interpreted as having ideal or excessively formal meaning unless clearly defined otherwise.

Hereinafter, embodiments of the inventive concept are described in detail with reference to the accompanying drawings.

Figure 1:
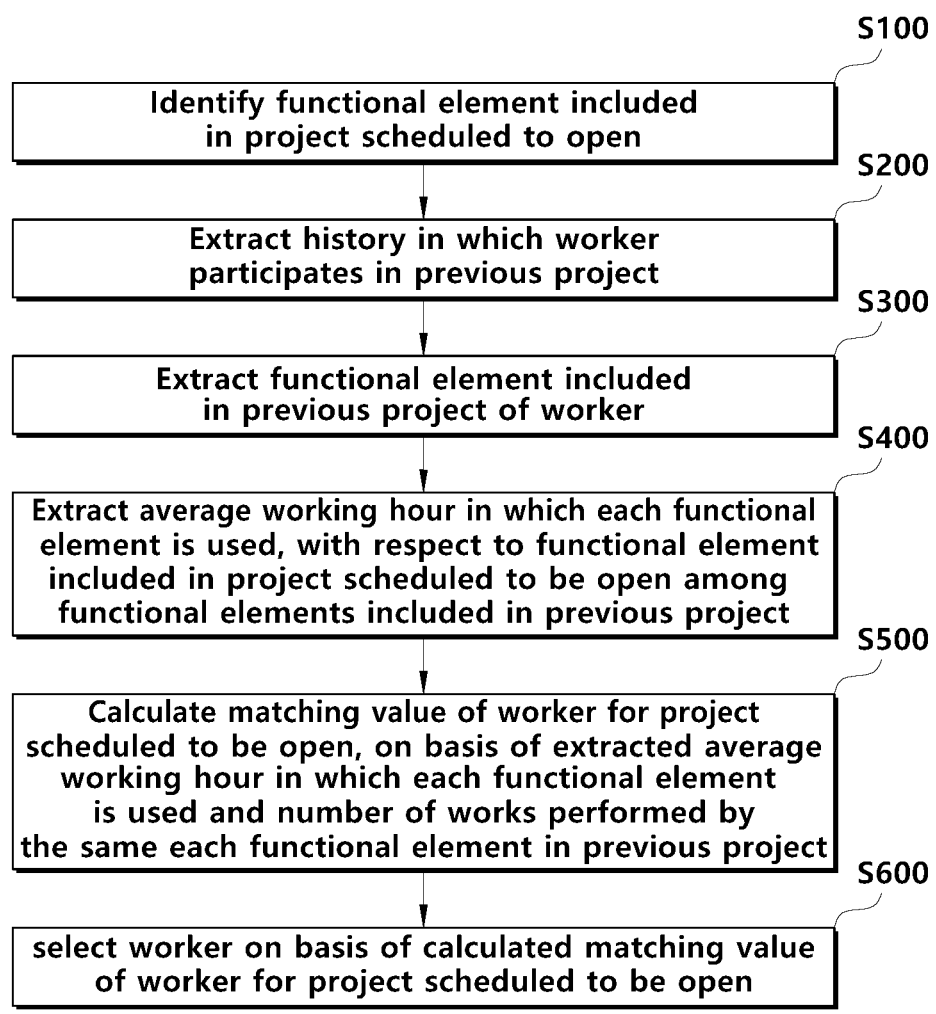
FIG. 1 is a flowchart of a method for selecting a worker according to a feature of a project based on crowd sourcing according to an embodiment of the inventive concept.
Figure 2:
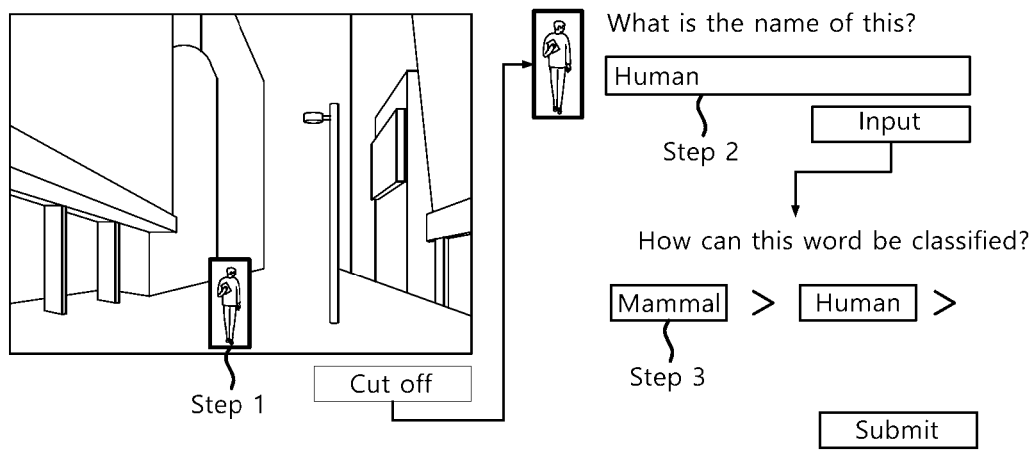
FIG. 2 is an exemplary view showing a work of a project according to an embodiment of the inventive concept.
Figure 3:
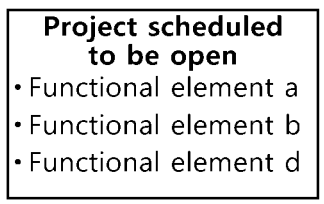
FIG. 3 is an exemplary view showing a functional element included in a project scheduled to be open according to an embodiment of the inventive concept.
Figure 4:
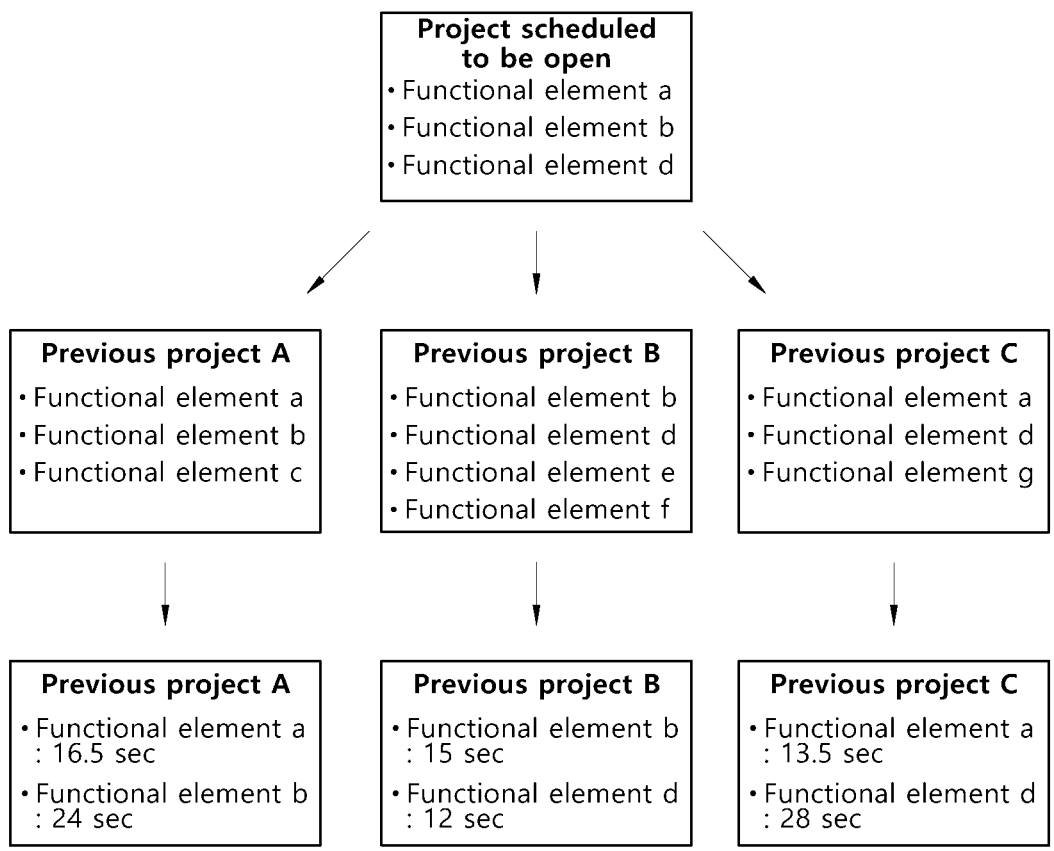
FIG. 4 is an exemplary view showing a history in which the worker participates in a previous project according to an embodiment of the inventive concept.

FIG. 1 is a flowchart of a method for selecting a worker according to a feature of a project based on crowd sourcing according to an embodiment of the inventive concept; FIG. 2 is an exemplary view showing a work of a project according to an embodiment of the inventive concept; FIG. 3 is an exemplary view showing a functional element included in a project scheduled to be open according to an embodiment of the inventive concept; FIG. 4 is an exemplary view showing a history in which the worker participates in a previous project according to an embodiment of the inventive concept; and FIG. 5 is an exemplary view showing that a working hour in which each functional element is used in a previous project, in which the worker participates, is calculated according to an embodiment of the inventive concept.

The project scheduled to be open according to the inventive concept may refer to a project based on crowd sourcing, which is planned by a corporation, or a project open by a crowd-sourcing service company based on a request from a customer. The corporation or the crowd-sourcing service company may be required to select the worker to perform the project before opening the project. That is, the corporation that plans the project, or the service company that provides the crowd-sourcing service, may select the worker to perform the project scheduled to be open, by performing each of S100 to S600 shown in FIG. 1. Here, S100 to S600 shown in FIG. 1 may each be performed by a server of the corporation that plans the project, or a server of the service company that provides the crowd-sourcing service, and is not limited thereto.

Referring to FIG. 1, in S100, the server may identify the functional element included in the project scheduled to be open. Here, the functional element may be determined based on a work tool used for performing the project. That is, the server may determine what work tool is used to perform the work of the project scheduled to be open, and may determine the functional element based thereon.

In an embodiment, the work of the project may be performed by means of a plurality of functional works. That is, the worker who participates in the project may complete one work by performing a plurality of work steps. Referring to FIG. 2, the worker may be required to perform a step 1, a step 2 and a step 3 to perform the work of the project.

In detail, the worker may perform the step 1, i.e., bounding work by selecting a specific object from a specific image (i.e., image provided by the corporation that plans the project to perform the work of the project, or image provided by the service company that provides the crowd-sourcing service). Here, the worker may use a bounding box tool to perform the bounding work.

The worker may then perform the step 2, i.e., transcription work by entering a name of the selected specific object. Here, the worker may use an input box tool to perform the transcription work.

The worker may then perform the step 3, i.e., feature classification work by selecting a high-level concept that includes a word input in the transcription work to classify a type of the named specific object. Here, the worker may use a make step tool to perform the feature classification work.

In addition, according to an embodiment, the functional element included in the project scheduled to be open may be basically set to be the same as the number and name of the work tool. However, the name of the functional element may be changed by a manager.

For example, it may be assumed that the worker needs to use the bounding box tool, the input box tool and the make step tool to perform the project scheduled to be open. In this case, the names of the functional elements may respectively be set to the bounding box tool, the input box tool and the make step tool, and the number of the functional elements may be set to three.

Here, as shown in FIG. 3, the name of each functional element may be changed to another, e.g., the bounding box tool to a functional element "a", the input box tool to a functional element "b", and the make step tool to a functional element "d".

Referring to FIG. 1, in S200, the server may extract the history in which the worker participates in the previous project. Here, the history in which the worker participates in the previous project may refer to information on the plurality of projects, in each of which the corresponding worker previously participates and performs the work, among the projects previously open and completed.

Referring to FIG. 1, in S300, the server may extract the functional element included in the previous project of the worker. That is, the server may extract the functional element included in each of the previous projects in which the worker participates. Referring to FIG. 4, it may be seen that the certain worker (e.g., worker "A") participates in a previous project "A", a previous project "B" and a previous project "C", in which: the previous project "A" includes the functional element "a", the functional element "b" and a functional element "c"; the previous project "B" includes the functional element "b", the functional element "d", a functional element "e" and a functional element "f"; and the previous project "C" includes the functional element "a", the functional element "d" and a functional element "g".

Referring to FIG. 1, in S400, the server may extract an average working hour in which each functional element is used, with respect to the functional element included in the project scheduled to be open among the functional elements included in the previous project. That is, it is possible to extract the average working hour in which each of the plurality of workers uses the functional element in the previous project when the corresponding previous project includes the same functional element as the functional element of the project scheduled to be open.

Referring to FIG. 4, for the functional elements "a", "b" and "d" of the project scheduled to be open, it may be seen that the worker "A" previously performs each work by using: the functional elements "a" and "b" in the previous project "A", the functional elements "b" and "d" in the previous project "B", and the functional elements "a" and "d" in the previous project "C".

In this regard, as shown in FIG. 4, the server may extract: 16.5 seconds (hereinafter, sec.) and 24 sec. as the respective average working hours in which the functional elements "a" and "b" are used in the previous project "A"; 15 sec. and 24 sec. as the respective average working hours in which the functional elements "b" and "d" are used in the previous project "B"; and 13.5 sec. and 28 sec. as the respective average working hours in which the functional elements "a" and "d" are used in the previous project "C".

According to an embodiment, the average working hour in which each functional element is used may be calculated based on information on the work of the previous project of the worker. Here, the information on the work of the previous project may include at least one of the following: a total working hour in which each functional element (i.e., work tool) is used, a total number of the works, an average working hour, the number of rejections, a working hour of a rejected work is performed or a working hour calculated considering the number of rejections. Here, the average working hour in which each functional element is used may be calculated considering a difficulty level of the work performed using the corresponding functional element, and the difficulty level of the work may be determined based on the number of times in which the corresponding work is rejected.

In detail, the working hour in which each functional element is used may be generated based on the following: information on cumulative time in which the corresponding tool is used by the plurality of workers from a time point at which the previous project is open to a time point at which the project is completed, the number of work results completed from the time point at which the previous project is open to the time point at which the project is completed, the average working hour based on the number of work results, the number of rejected work results during the work, rework time in which a rework is performed on the rejected work result or a working hour calculated considering the rework time.

Here, the total working hour may be generated by recording the start time point and the end time point, at which the specific functional element (i.e., work tool) is used, in the previous project, and may refer to a total time in which the corresponding tool is used by the plurality of workers who participate in the previous project. In addition, the total number of works may refer to the final work result provided by the plurality of workers. In addition, the number of the rejections may refer to the number of times in which the work result submitted by the worker is rejected by the project manager (e.g., inspector) during the project. In this case, the worker may be supposed to rework the rejected work result and submit the reworked work result again. Here, the rejected work result may not be included in the total number of the works. One work result may be rejected multiple times, and this case may thus be included as one work in the total number of the works.

According to an embodiment, the average working hour (or sec.) may refer to a value obtained by dividing the total working hour (or sec.) by the total number of the works, the working hour (or sec.) in which the rejected work is performed may refer to a value obtained by multiplying the number of the rejections by the average working hour (or sec.), and the working hour (or sec.) calculated considering the number of the rejections may refer to a sum of the total working hour (or sec.) and the working hour (or sec.) in which the rejected work is performed.

The average working hour (or sec.) in which each functional element is used may thus be calculated by dividing the working hour (or sec.) calculated considering the number of the rejections by the total number of the works.

A process of calculating respective average working hours, in which the functional elements "a", "b" and "c" included in the previous project "A" are used, is described with reference to FIG. 5.

In the previous project "A", 1500 sec. may be the total working hour using the functional element "a" (i.e. bounding box tool) and 100 may be the total number of the works. In this case, 15 sec. is the average working hour. Here, 10 may be the number of the rejections, and 150 sec. is thus the working hour in which the rejected work is performed, obtained by multiplying the average working hour by the number of the rejections. Accordingly, 1650 sec. is the total working hour (i.e., number of the working hours calculated considering the number of the rejections) in which the functional element "a" is used in the previous project "A", and this value may be divided by 100, which is the total number of the works, to calculate 16.5 sec. as the average working hour in which the functional element "a" is used.

In addition, in the previous project "A", 800 sec. may be the total working hour using the functional element "b" (i.e. input box tool) and 50 may be the total number of the works. In this case, 16 sec. is the average working hour. Here, 25 may be the number of the rejections, and 400 sec. is thus the working hour in which the rejected work is performed, obtained by multiplying the average working hour by the number of the rejections. 1200 sec. is thus the total working hour (i.e., number of the working hours calculated considering the number of the rejections) in which the functional element "b" is used in the previous project "A", and this value is divided by 50, which is the total number of the works, to calculate 24 sec. as the average working hour in which the functional element "b" is used.

In addition, in the previous project "A", 600 sec. may be the total working hour using the functional element "c" (i.e. make step tool) and 12 may be the total number of the works. In this case, 50 sec. is the average working hour. Here, 3 is the number of the rejections, and 150 sec. is thus the working hour in which a rejected work is performed, obtained by multiplying the average working hour by the number of the rejections. 750 sec. is thus the total working hour (i.e., number of the working hours calculated considering the number of the rejections) in which the functional element "c" is used in the previous project "A", and this value is divided by 12, which is the total number of the works, to calculate 62.5 sec. as the average working hour in which the functional element "c" is used.

Referring to FIG. 1, in S500, the server may calculate a matching value of the worker for the project scheduled to be open, on the basis of the extracted average working hour in which each functional element is used and the number of the works performed by the worker using each functional element in the previous project. Here, the matching value of the worker for the project scheduled to be open may be a value obtained by calculating how much work the worker performs in the previous project by using the functional elements included in the project scheduled to be open, and thus, it may be used to determine whether the worker has work ability suitable for the project scheduled to be open.

According to an embodiment, the server may calculate: a first working hour by multiplying the average working hour in which a first functional element is used and the number of works performed by the worker using the first functional element; a second working hour by multiplying the average working hour in which a second functional element is used and the number of works performed by the worker using the second functional element; and an n-th working hour (here, n is a natural number) by multiplying the average working hour in which an n-th functional element (here, n is a natural number) is used and the number of works performed by the worker using the n-th functional element. It is then possible to calculate the matching value of the worker for the project scheduled to be open by summing the n-number of working hours, i.e., first working hour, the second working hour and the n-th working hour, together.

Here, the plurality of functional elements may each be included in the different projects when the plurality of functional elements are determined among the n-number of functional elements, i.e., first functional element, the second functional element, . . . and the n-th functional element, based on the same work tool. That is, the first functional element may be included in the previous project "A" and the second functional element may be included in the previous project "B" even though both the first functional element and the second functional element are the same functional element determined based on the bounding box tool. These functional elements may thus be applied with different weights when calculating the matching value of the worker for the project scheduled to be open.

Referring to FIG. 4, for the functional elements "a", "b" and "d" of the project scheduled to be open, it may be seen that the worker "A" previously performs each work by using: the functional elements "a" and "b" in the previous project "A", the functional elements "b" and "d" in the previous project "B"; and the functional elements "a" and "d" in the previous project "C". The matching value of the worker for the project scheduled to be open may thus be calculated by setting: the first functional element as the functional element "a" of the previous project "A"; the second functional element as the functional element "b" of the previous project "A"; the third functional element as the functional element "b" of the previous project "B"; the fourth functional element as the functional element "d" of the previous project "B"; the fifth functional element "as the functional element "a" of the previous project "C"; and the sixth functional element as the functional element "d" of the previous project "C".

In detail, 165 sec. is the first working hour when 16.5 sec. and 10 are the average working hour in which the first functional element is used and the total number of the works which are completed by the worker, respectively; 120 sec. is the second working hour when 24 sec. and 5 are the average working hour in which the second functional element is used and the total number of the works which are completed by the worker, respectively; 90 sec. is the third working hour when 15 sec. and 6 are the average working hour in which the third functional element is used and the total number of the works which are completed by the worker, respectively; 24 sec. is the fourth working hour when 12 sec. and 2 are the average working hour in which the fourth functional element is used and the total number of the works which are completed by the worker, respectively; 108 sec. is the fifth working hour when 13.5 sec. and 8 are the average working hour in which the fifth functional element is used and the total number of the works which are completed by the worker, respectively; and 84 sec. is the sixth working hour when 28 sec. and 3 are the average working hour in which the sixth functional element is used and the total number of the works which are completed by the worker, respectively.

Therefore, the matching value of the worker for the project scheduled to be open may be calculated as 165+120+90+24+108+84=591, i.e. value obtained by summing the first working hour, the second working hour, the third working hour, the fourth working hour, the fifth working hour and the sixth working hour together.

According to another embodiment, zero may be set as a value of the number of works performed using the specific functional element to reduce influence of the working hour in which the corresponding functional element is used when the number of the works performed by the worker using the corresponding functional element is less than or equal to an average number of works performed using the corresponding functional element. That is, it may be assumed that the number of the works completed by the certain worker using the specific functional element is less than the average number of the works completed by the plurality of workers using the functional element. In this case, zero may be set as a weight value for the functional element, thereby excluding a value of the above number of the works completed by the worker from the matching value.

For example, it may be assumed that 13 is the first average number of the works performed using the first functional element, whereas 16.5 sec. and 10 are the average working hour in which the first functional element is used and the total number of the works which are completed by the worker, respectively; 24 sec. and 5 are the average working hour in which the second functional element is used and the total number of the works which are completed by the worker, respectively; 15 sec. and 6 are the average working hour in which the third functional element is used and the total number of the works which are completed by the worker, respectively; 12 sec. and 2 are the average working hour in which the fourth functional element is used and the total number of the works which are completed by the worker, respectively; 13.5 sec. and 8 are the respective average working hour in which the fifth functional element is used and the total number of the works which are completed by the worker, respectively; and 28 sec. and 3 are the average working hour in which the sixth functional element is used and the total number of the works which are completed by the worker, respectively. In this case, the total number (i.e., 10) of the work which is completed by the worker using the first functional element is less than the first average number (i.e., 13) of the work performed using the functional element. Therefore, the matching value of the worker for the project scheduled to be open may be calculated as 16.5*0+24*5+15*6+12*2+13.5*8+28*3=426.

In addition, according to another embodiment, zero may be set as a value of the number of the works performed using the specific functional element to reduce the influence of the working hour in which the functional element is used in a case where the worker has a rank lower than a predetermined standard rank, when the workers are ranked based on the number of the works performed using the corresponding functional element. That is, zero may be set as the weight value for the functional element, and thus excluding the value of the above number of the works completed by the worker from the matching value in a case where the worker has the rank lower than a middle rank when the workers are ranked based on the number of the works completed by each worker using the specific functional element.

For example, it may be assumed that 16.5 sec. and 10 are the average working hour in which the first functional element is used and the total number of the works which are completed by the worker, respectively; 24 sec. and 5 are the average working hour in which the second functional element is used and the total number of the works which are completed by the worker, respectively; 15 sec. and 6 are the average working hour in which the third functional element is used and the total number of the works which are completed by the worker, respectively; 12 sec. and 2 are the average working hour in which the fourth functional element is used and the total number of the works which are completed by the worker, respectively; 13.5 sec. and 8 are the average working hour in which the fifth functional element is used and the total number of the works which are completed by the worker, respectively; and 28 sec. and 3 are the average working hour in which the sixth functional element is used and the total number of the works which are completed by the worker, respectively. In this case, 40 out of a total rank of 60 may be a cumulative rank of the worker who previously completes the work by using the first functional element. The matching value of the worker for the project scheduled to be open may then be calculated as 16.5*0+24*5+15*6+12*2+13.5*8+28*3=426.

In addition, according to another embodiment, as described above, the method of reducing the influence of the working hour in which the specific functional element is used may be applied separately to the case in which the number of the works completed by the worker is less than a predetermined number of works and the case in which the worker has a rank lower than the predetermined rank, or may be applied together to both the cases.

Referring to FIG. 1, in S600, the server may select the worker on the basis of the calculated matching value of the worker for the project scheduled to be open. That is, the server may rank the plurality of workers in descending order based on the matching value of the worker for the project scheduled to be open, and may select the worker based on the number of the workers required for the project scheduled to be open. That is, it may be assumed that 50 is the number of the workers required for the project scheduled to be open. In this case, the server may rank the calculated matching values of the plurality of workers for the project scheduled to be open in the descending order, and may exclude workers ranked lower than a 50-th rank from the worker pool of the project scheduled to be open.

According to an embodiment, the server may also use, as the matching value of the worker for the project scheduled to be open, a value obtained by dividing the total working hours, calculated by weighting the number of the works completed by the worker in the average working hour in which each functional element is used, by the number of all the works (i.e., total sum of the works completed by the worker using each functional element).

According to another embodiment, the functional element or work history of the worker in the project scheduled to be open may be changed in real time, the matching value of each worker for the project scheduled to be open may thus be changed in real time by applying the changed information thereto. Therefore, the worker included in the worker pool of the project scheduled to be open may also be changed in real time.

In some embodiments, a work of the project is rejected.

In some embodiments, the project may be configured to perform the bounding work and the transcription work. The worker may obtain bounding work results by performing the bounding work on each text in an image provided by the server. The worker may then obtain transcription work resuts by performing the transcription work on each bounding work result.

According to an embodiment, the server (or inspector) may reject the work results each obtained by the worker performing the bounding work and the transcription work. In detail, the worker may perform the bounding work to obtain the bounding work result and the transcription work to obtain the transcription work result. Here, the server may determine that the bounding work result fails to meet a condition, and may then pass only the work result and reject the work result.

For example, the bounding work result may be rejected when: a bounded box has a lot of blank space, a text included in the bounded box is cut off, a lot of polygons are drawn without need, first and second points set for a vertical setting are not horizontal to each other, and the bounding work is not proceeded clockwise.

FIG. 6 is an exemplary view showing a composition ratio of each functional element in the previous project according to an embodiment of the inventive concept.

The composition ratio of each functional element may refer to the ratio of the working hour in which each functional element is used and which is calculated considering the number of the rejections, to the total working hour calculated considering the number of the rejections. Referring to FIG. 6, the functional element "a" occupies 1650 sec., the functional element "b" occupies 1200 sec., and the functional element "c" occupies 750 sec., of the total working hour 3600 sec. Therefore, the composition ratios of functional elements "a", "b" and "c" in the project "A" may be calculated as 46%, 33% and 21%, respectively.

In an embodiment, the server may calculate the composition ratio of each functional element used in the previous project to determine similarity between the previous project and the project scheduled to be open. That is, the server may compare the calculated composition ratio of each functional element in the previous project with the expected composition ratio of each functional element in the project scheduled to be open to extract a project similar to the project scheduled to be open among the previous projects, and to use this similar project as a reference for selecting the worker for the project scheduled to be open.

FIG. 7 is a block diagram of an apparatus for selecting the worker according to a feature of a project based on crowd sourcing according to an embodiment of the inventive concept.

Referring to FIG. 7, an apparatus 100 for selecting a worker according to a feature of a project based on crowd sourcing (hereinafter, referred to as 'apparatus for selecting a worker') may include a communicator 110, a determination device 120, an extractor 130, a calculator 140, a controller 150, and storage 160.

The communicator 110 may communicate with at least one of a terminal of a customer, a terminal of a worker, or a terminal of a manager to transmit and receive data.

The determination device 120 may identify a plurality of functional elements included in a work of a project scheduled to be open. In addition, the determination device 120 may determine whether to select the worker based on a calculated matching value of the worker for the project scheduled to be open.

The extractor 130 may extract a history in which the worker participates in a previous project and a functional element which is included in each of the previous projects. In addition, the extractor 130 may extract an average working hour in which each functional element is used, with respect to the functional element, identified to be included in the project scheduled to be open by the determination device 120, among the functional elements included in the previous project.

The calculator 140 may calculate the matching value of the worker for the project scheduled to be open, based on the average working hour in which each functional element is used and the number of works which are performed by the worker using each functional element, in the previous project, extracted by the extractor 130.

The controller 150 may control each component of the apparatus 100 for selecting a worker.

The storage 160 may store and manage the data received by the apparatus 100 for selecting a worker and data generated by a work unit-price measurement device 100.

The method for selecting a worker according to a feature of a project based on crowd sourcing according to an embodiment of the inventive concept described above may be implemented as a program (or application) to be executed in combination with a computer, which is hardware, and stored in a medium.

In order for the computer to read the program and execute the methods implemented as the program, the above-described program may include a code coded in a computer language such as C, C++, JAVA, Ruby, machine language or the like, which may be read by a processor (CPU) of the computer through a device interface of the computer. The code may include a functional code related to a function defining functions necessary for executing the above methods and the like, and may include a control code related to an execution procedure, which is necessary for the processor of the computer to execute the functions according to a predetermined procedure. In addition, the code may further include a memory-reference related code indicating from which position (address) of the internal or external memory of the computer, the additional information or media, which is necessary for the processor of the computer to execute the above functions, is to be referenced. In addition, the code may further include a communication-related code indicating how to communicate with any other remote computer, server or the like by using a communication module of the computer, what information or media to be transmitted and received during the communication or the like, when the processor of the computer needs to communicate with any other computer, server or the like in a remote location in order to execute the functions.

The storage medium is not a medium that temporarily stores data, such as a register, a cache, a memory or the like, and may refer to a medium that semi-permanently stores data and is readable by the device. In detail, the storage medium may include a read only memory (ROM), a random access memory (RAM), a compact disk read only memory (CD-ROM), a magnetic tape, a floppy disk, an optical data storage device or the like, and may not be limited thereto. That is, the program may be stored in various recording media on various servers that the computer may access or in various recording media on the computer of a user. In addition, the medium may be distributed in a network-connected computer system, and a computer-readable code may be stored in a distributed manner.

According to embodiments of the inventive concept as described above, the following effects may be accomplished.

First, it is possible to calculate a worker score for each functional element of the project scheduled to be open, rather than the conventional classification item of the project, which is set once, thereby selecting the worker more suitable for the project scheduled to be open by excluding an element unnecessary for evaluating the worker.

Secondly, the worker pool may be generated based on a matching score of the worker, which is calculated for each functional element. Therefore, it is possible to generate the worker pool in real time by applying a change thereto even when there is a factor of the change in the project or the history of the existing worker is updated.

Effects of the inventive concept are not limited to the effects mentioned above, and other effects not mentioned here may be clearly understood by those skilled in the art from the following description.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for selecting a worker according to a feature of a project based on crowd sourcing, the method comprising:
   receiving, by a server including a hardware processor, from worker terminals, which are hardware devices, work data, and storing the received data in a non-transitory memory storage of the server;
   identifying, by the server, a functional element included in a project scheduled to be open, based on the data stored in the non-transitory memory storage;
   extracting, by the server, a history in which the worker participates in a previous project;
   extracting, by the server, the functional element included in the previous project of the worker;
   extracting, by the server, an average working hour in which each functional element is used, with respect to the functional element included in the project scheduled to be open among the functional elements included in the previous project;
   calculating, by the server, a matching value of the worker for the project scheduled to be open, on the basis of the extracted average working hour in which each functional element is used and the number of works performed by the worker using each functional element included in the previous project;
   selecting, by the server, the worker on the basis of the calculated matching value of the worker for the project scheduled to be open; and
   transmitting, by the server, to one or more of the worker terminals, customer terminals, and manager terminals, information on the selected workers,
   wherein the functional element is determined based on a work tool for performing the project,
   the work tool is a tool provided by the project based on crowd sourcing, and used by the worker to perform the work required for the project based on crowd sourcing, and
   an average working hour, in which each functional element is used, is calculated based on a total working hour in which each work tool is used, a total number of the works, an average working hour, the number of rejections, a working hour of a rejected work and a working hour considering the number of the rejections,
   wherein the calculating of the matching value of the worker for the project scheduled to be open includes:
   calculating a first working hour by multiplying the average working hour in which a first functional element is used and the number of works performed by the worker using the first functional element;
   calculating a second working hour by multiplying the average working hour in which a second functional element is used and the number of works performed by the worker using the second functional element;
   calculating an n-th working hour (here, n is a natural number) by multiplying the average working hour in which an n-th functional element (here, n is a natural number) is used and the number of works performed by the worker using the n-th functional element; and
   summing the first working hour, the second working hour, and the n-th working hour together.

2. The method of claim 1, wherein the average working hour, in which each functional element is used, is calculated considering a difficulty level of the work performed using a corresponding functional element.

3. The method of claim 1, wherein a plurality of functional elements are each included in different previous projects when the plurality of functional elements among the first functional element, the second functional element, ... and the n-th functional element are determined based on the same work tool.

4. The method of claim 1, wherein in the calculating of the matching value of the worker for the project scheduled to be open,
   zero is set as a value of the number of works performed using a specific functional element to reduce influence of the working hour in which a corresponding functional element is used
   when the number of the works performed by the worker using the corresponding functional element is less than or equal to an average number of works performed using the corresponding functional element.

5. The method of claim 1, wherein the calculating of the matching value of the worker for the project scheduled to be open includes:
   zero is set as a value of the number of the works performed using a specific functional element to reduce influence of the working hour in which a corresponding functional element is used
   when the worker has a rank lower than a predetermined standard rank, when the workers are ranked based on the number of works performed using the corresponding functional element.

6. The method of claim 1, wherein in the selecting of the worker,
   a plurality of workers are ranked in descending order based on the matching value of the worker for the project scheduled to be open, and the worker is selected based on the number of workers required for the project scheduled to be open.

7. The method of claim 1, wherein the history in which the worker participates in the previous project is information on a plurality of projects, in each of which a specific worker previously participates and performs the work.

8. A non-transitory computer-readable recording medium for selecting a worker according to a feature of a project based on crowd sourcing, that is associated with a computer hardware, and storing a program including instructions to implement steps of:
   receiving, by a server including a hardware processor, from worker terminals, which are hardware devices, work data, and storing the received data in a non-transitory memory storage of the server;

identifying, by the server, a functional element included in a project scheduled to be open, based on the data stored in the non-transitory memory storage;

extracting, by the server, a history in which the worker participates in a previous project;

extracting, by the server, the functional element included in the previous project of the worker;

extracting, by the server, an average working hour in which each functional element is used, with respect to the functional element included in the project scheduled to be open among the functional elements included in the previous project;

calculating, by the server, a matching value of the worker for the project scheduled to be open, on the basis of the extracted average working hour in which each functional element is used and the number of works performed by the worker using each functional element included in the previous project;

selecting, by the server, the worker on the basis of the calculated matching value of the worker for the project scheduled to be open; and transmitting, by the server, to one or more of the worker terminals, customer terminals, and manager terminals, information on the selected workers, wherein the functional element is determined based on a work tool for performing the project, the work tool is a tool provided by the project based on crowd sourcing, and used by the worker to perform the work required for the project based on crowd sourcing, and an average working hour, in which each functional element is used, is calculated based on a total working hour in which each work tool is used, a total number of the works, an average working hour, the number of rejections, a working hour of a rejected work and a working hour considering the number of the rejections, wherein the calculating of the matching value of the worker for the project scheduled to be open includes:

calculating a first working hour by multiplying the average working hour in which a first functional element is used and the number of works performed by the worker using the first functional element;

calculating a second working hour by multiplying the average working hour in which a second functional element is used and the number of works performed by the worker using the second functional element;

calculating an n-th working hour (here, n is a natural number) by multiplying the average working hour in which an n-th functional element (here, n is a natural number) is used and the number of works performed by the worker using the n-th functional element; and summing the first working hour, the second working hour, and the n-th working hour together.

\* \* \* \* \*